United States Patent [19]

Colliver et al.

[11] Patent Number: 4,643,644

[45] Date of Patent: Feb. 17, 1987

[54] SHAFT AND PULLEY ASSEMBLY

[75] Inventors: Anthony D. Colliver; Robert W. Wrightson, both of St. Marys, Australia

[73] Assignee: F.F. Seeley Nominees Pty., Ltd., St. Marys, Australia

[21] Appl. No.: 663,856

[22] Filed: Oct. 23, 1984

[30] Foreign Application Priority Data

Oct. 26, 1983 [AU] Australia ............................. PG2056

[51] Int. Cl.$^4$ ...................... F04D 29/20; F16C 19/04
[52] U.S. Cl. .................................. 416/174; 416/184; 416/204 R; 384/536; 403/371
[58] Field of Search ............... 416/184, 60 R, 183, 416/185, 186, 188, 189, 174, 179, 182, 204 R, 204 A; 403/383, 365, 371; 384/536, 539, 585; 464/162, 178; 285/176; 417/362

[56] References Cited

U.S. PATENT DOCUMENTS

| 1,345,951 | 7/1920 | Phelps | 416/184 |
| 2,563,040 | 8/1951 | Junkunc | 403/371 |
| 2,637,489 | 5/1953 | Place | 416/184 |
| 2,793,512 | 5/1957 | Larsen | 464/162 |
| 2,922,680 | 1/1960 | Marquis et al. | 384/536 |
| 3,190,543 | 6/1965 | Goettl | 416/184 |
| 3,399,911 | 9/1968 | Reisch | 403/383 |
| 3,481,655 | 12/1969 | Campbell | 384/536 |
| 3,627,445 | 12/1971 | Andriussi et al. | 416/170 R |
| 3,917,425 | 11/1975 | Allaben, Jr. | 403/371 |
| 3,918,779 | 11/1975 | Halliger et al. | 403/371 |
| 4,017,128 | 4/1977 | Setele et al. | 384/536 |
| 4,115,030 | 9/1978 | Inagaki et al. | 416/185 |
| 4,229,055 | 10/1980 | Olschewski et al. | 384/536 |

FOREIGN PATENT DOCUMENTS

| 2159932 | 6/1973 | Fed. Rep. of Germany | 416/184 |
| 2624951 | 12/1977 | Fed. Rep. of Germany | 384/536 |
| 3050372 | 10/1982 | Fed. Rep. of Germany | 416/179 |

Primary Examiner—Robert E. Garrett
Assistant Examiner—Joseph M. Pitko
Attorney, Agent, or Firm—Henry Sternberg; Bert J. Lewen

[57] ABSTRACT

A shaft and pulley assembly for a blower having a scroll housing containing an impeller utilizes a square section shaft having a pulley retained thereon, an impeller having a hub with inner surfaces which lie in face-to-face contiguity with the shaft, a pair of adaptors having inner surfaces which also lie in face-to-face contiguity with the shaft and having curved external surfaces which support the adaptors from bearings which are themselves carried in bearing housings which are fixed with respect to the scroll housing, at least one of the adaptors having latches thereon which retain its said bearing against displacement.

9 Claims, 4 Drawing Figures

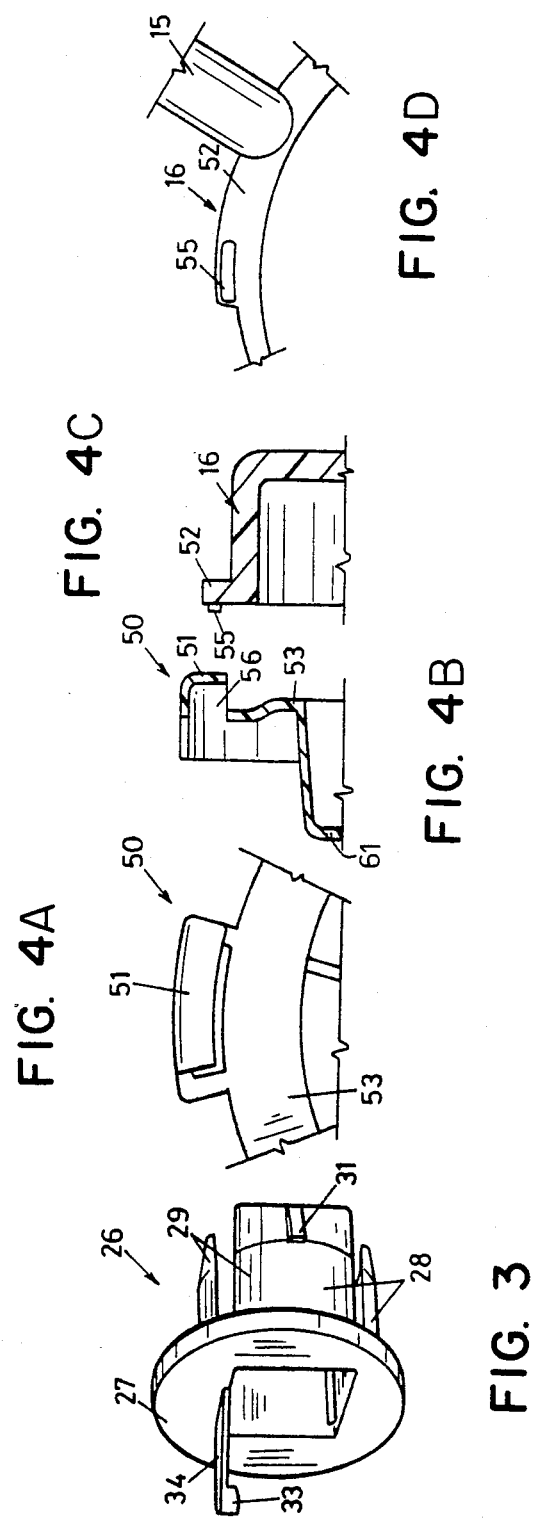

SHAFT AND PULLEY ASSEMBLY

This invention relates to a shaft and pulley assembly for a blower having a scroll housing containing an impeller, and is particularly useful in an evaporative cooler wherein very humid conditions are encountered.

BACKGROUND OF THE INVENTION

In evaporative type air coolers it is desirable that there be a minimum number of metal parts due to danger of corrosion, and there is a need to key a shaft and impeller together so that there is little danger of relative rotational movement due to torsional forces.

If an impeller is formed from polymeric material by an injection moulding process, and the impeller is to be mounted on a circular section shaft it is usually necessary to incorporate a key insert in the hub of the impeller, and this reduces production output of a moulding machine. One object of this invention is to provide improvements wherein an impeller can be moulded entirely as an integral moulding of polymeric material without any metal inserts, and in this invention this is achieved by utilising a square section shaft which is engaged by inner surfaces of the hub of the impeller. If the hub is made of sufficient length the risk of relative rotational movement with respect to the shaft can be so small as to be negligible.

Another problem which is encountered in production is the difficulty of quick and efficient assembly, and in this invention there are provided adaptors near each end of the shaft, each adaptor having internal surfaces lying in face-to-face contiguity with the surfaces of the shaft and having curved external surfaces which support respective bearings.

BRIEF SUMMARY OF THE INVENTION

Briefly, in this invention therefore a shaft and pulley assembly for a blower having a scroll housing containing an impeller utilises a square section shaft having a pulley retained thereon, an impeller having a hub with inner surfaces which lie in face-to-face contiguity with the shaft, a pair of adaptors having inner surfaces which also lie in face-to-face contiguity with the shaft and having curved external surfaces which support the adaptors from bearings which are themselves carried in bearing housings which are fixed with respect to the scroll housing, at least one of the adaptors having latches thereon which retain its said bearing against displacement.

More specifically the invention consists of a shaft and pulley assembly for a blower having a scroll housing containing an impeller, and comprises a square section shaft, a pulley, and means retaining the pulley on the shaft, said impeller having a hub with inner surfaces lying in face-to-face contiguity with surfaces of the shaft, a pair of adaptors carried on the shaft near respective ends thereof, each adaptor having inner surfaces lying in face-to-face contiguity with surfaces of the shaft, each adaptor also having curved external surfaces, a pair of bearings carried on respective said adaptors supported by said curved external surfaces thereof, latches on at least one of said adaptors retaining its said bearing against relative displacement in an axial direction, a pair of bearing housings each fixed with respect to said scroll housing, and each carrying a respective said bearing.

With this invention the interengagement between the shaft, impeller and adaptors can be over a wide surface area so that there is a minimal risk of relative rotation (working loose of those elements with respect to the shaft). The bearings can be assembled by merely pushing them onto the adaptors, and the bearings may be retained by retaining rings which may for example have bayonet cap type locking devices thereon.

BRIEF DESCRIPTION OF THE DRAWINGS

An embodiment of the invention is described hereunder in some detail with reference to and is illustrated in the accompanying drawings in which:

FIG. 3 is a perspective view of one of the adaptors; and

FIG. 4 is an "exploded" view showing part end elevational views and part section views of a bearing housing and retainer ring.

DETAILED DESCRIPTION OF THE DRAWINGS

Figure 1:
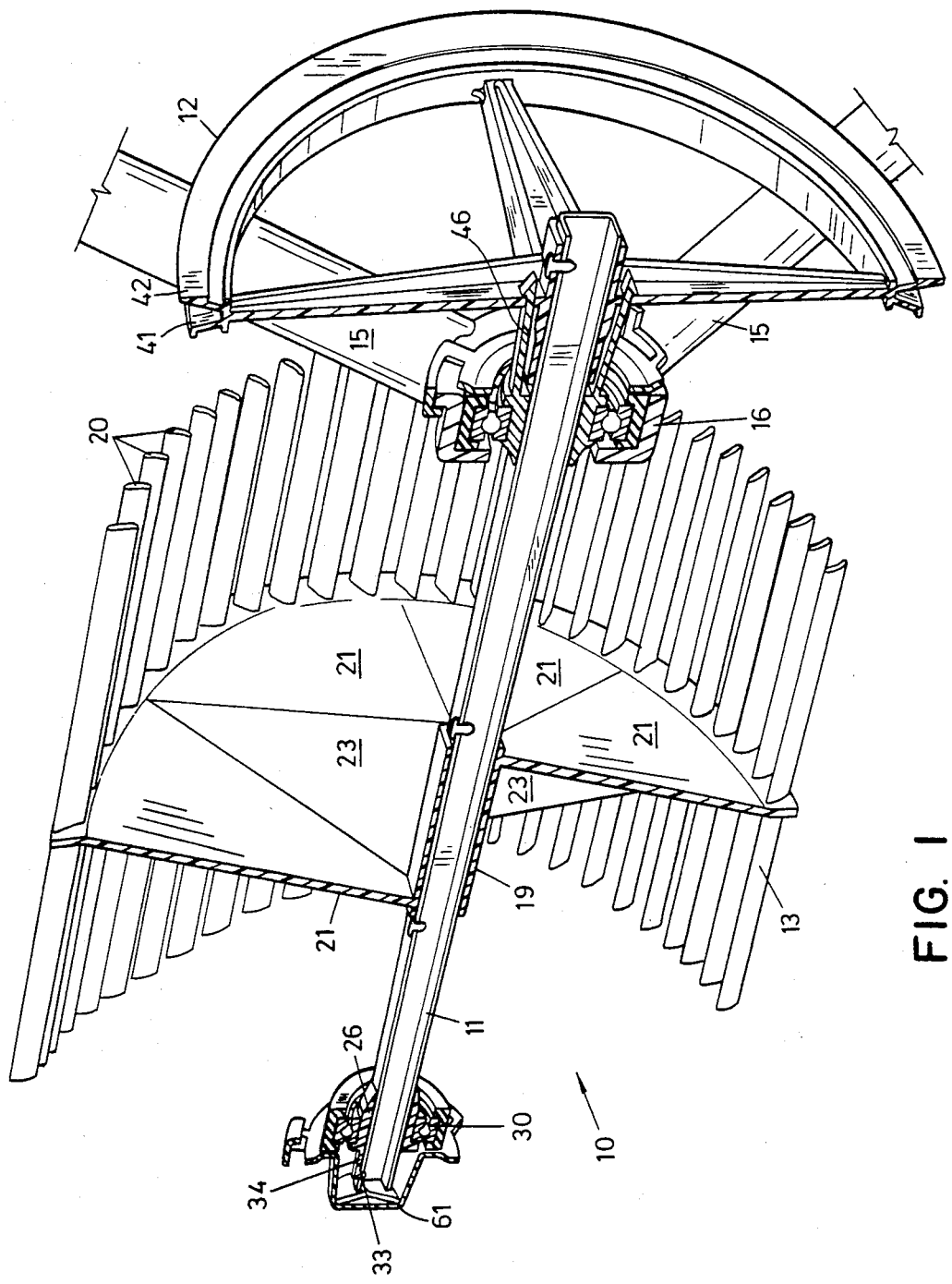
FIG. 1 is a perspective section showing a shaft and pulley assembly supporting an impeller for a blower of the type having a scroll housing (said housing not being illustrated herein)

In this embodiment a shaft and pulley assembly 10 comprises a square section hollow shaft 11, a pulley 12, and an impeller 13. The impeller 13 is contained within a scroll housing (not shown) but the scroll housing is in accordance with known art and does not form part of the invention. However the scroll housing is provided with three inwardly radiating arms 15 at each end to support bearing housings 16, this arrangement also being generally in accordance with known art.

Figure 2:
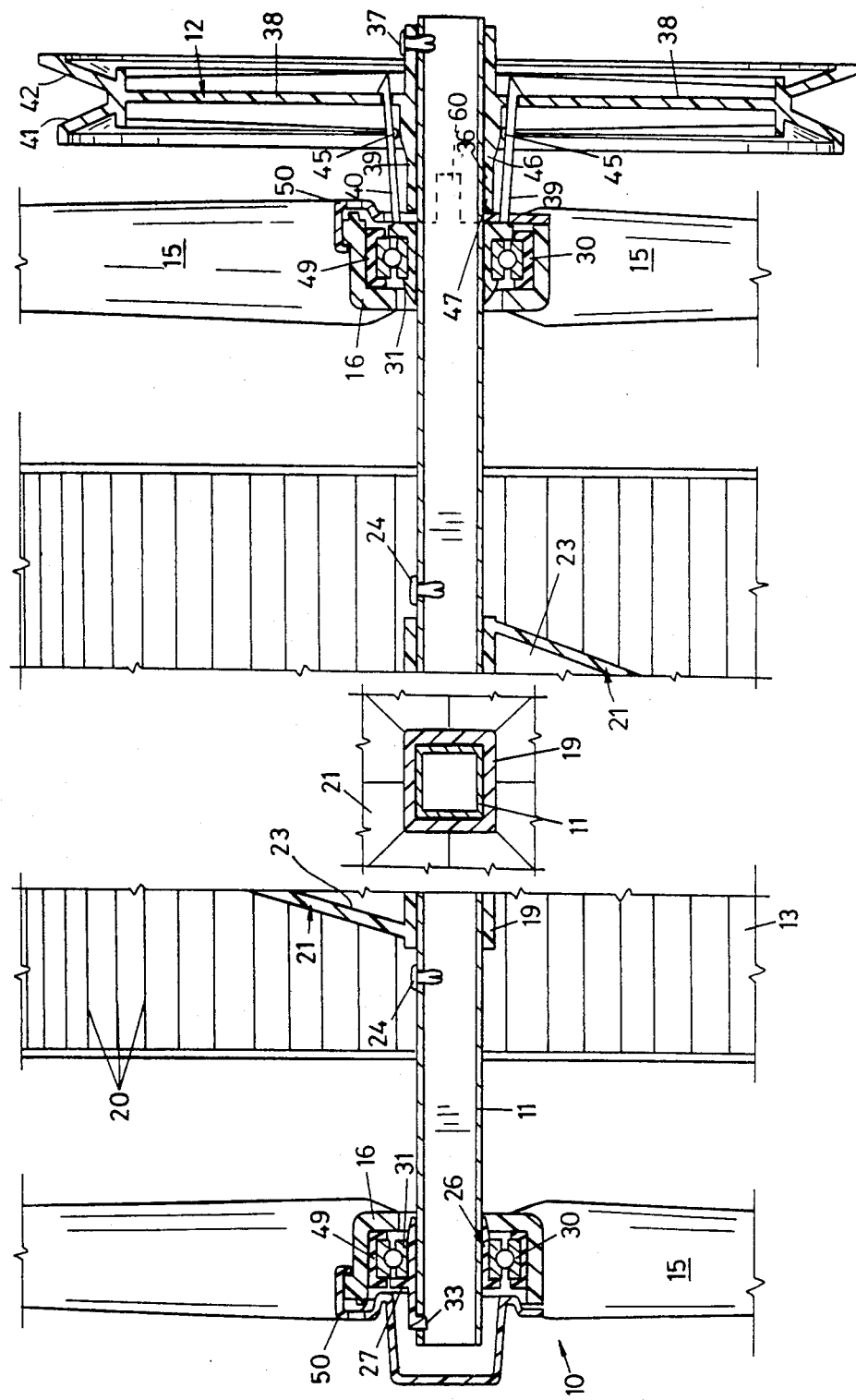
FIG. 2 is an elevational section illustrating the shaft pulley and impeller assembly.

In this embodiment however the impeller 13 is provided with a hub 19 (shown both in elevational and cross-section in FIG. 2), and this hub 19 supports a plurality of blower blades 20 by way of a central wheel 21 which instead of being discoid as in some prior art fans, comprises a plurality of webs which slope in elevational section as shown in FIG. 2 and these are interconnected by axially extending ribs 23. This web and rib shape provides stiffness against deflection of the blades 20 with respect to the hub 19 and also provides means by which high torque forces may be imparted without over-stressing the polymeric material comprised in the impeller 13. The impeller 13 is a unitary moulding without any inserts, and as seen best in the centre of FIG. 2, the inner surfaces of hub 19 define a square and they lie in face-to-face contiguity with the outer surfaces of the shaft 11. The hub 19 is restrained against axial displacement by a pair of resilient plastic pins 24.

As seen in the drawings, at the left hand end of shaft 11 there is provided a square to circular adaptor 26, and this is shown in perspective in FIG. 3. The adaptor 26 is provided with an annular portion 27 near one end, and four bearing lands 28 extending therefrom, the inner surfaces of the bearing lands 28 being planar and lying in face-to-face contiguity with the shaft 11 and the outer surfaces 29 thereof being curved surfaces which support a bearing 30. Two of the lands 28 are provided with respective latches 31, and the adaptor 26 is formed from resilient plastics material which enables the bearing 30 to be pushed over lands 28 but once the adaptor and bearing sub-assembly is positioned over the shaft 11, deflection is inhibited and the bearing 30 is positively retained to its adaptor 26. Axial displacement of that sub-assembly is itself restrained by engagement of a spigot 33 in an aperture near the left hand end of shaft 11, but this spigot 33 is on the end of a finger 34 which can be deflected to disengage from shaft 11 to enable the bearing and land sub-assembly to be removed from the shaft if and when required.

At the right hand end of the shaft 11 as seen in FIG. 2, the pulley 12 is provided with a hub 36 which, like the hub 19, is square in shape and which has inner surfaces lying in face-to-face contiguity with the shaft surfaces. The hub 36 is retained in position by a pin 37. The pulley 12 also has a plurality of spokes 38, and two of these spokes contain apertures which receive latch arms 39 of the square to circular adaptor 40, which, apart from its latch arms 39 and the absence of the finger and spigot 34/33, is similar to the adaptor 26 illustrated in FIG. 3. The rim of the pulley 12 is provided with diverging flanges 41 and 42, the flange 42 on the outer side of pulley 12 being longer than flange 41 so as to provide outer surfaces for frictional driving of a mechanical water pump if that is required.

Referring now to the details of the adaptor 40, each latch arm 39 is provided with a respective projection 45 and this rides up over respective ramp surfaces 46 on the hub 36 thereby causing the latches to positively engage the spokes 38 and inhibit release. Spacer 47 extends between adaptor 40 and hub 36.

Reference is now made to the arrangement for retaining the bearings 30 in their respective bearing housings 16. Transmission of noise through the shaft of an air cooler is one of the problems which is commonly met, and to reduce such transmission in this embodiment the bearings 30 are surrounded by respective annular rubber spacer rings 49, and the bearings are retained within their respective housings 16 by means of bayonet type retainer rings 50, illustrated in more detail in FIG. 4.

FIG. 4A is a part end elevation and FIG. 4B is a part section in first angle projection which illustrates a retainer ring 50 having an inturned flange 51 which is arranged to engage over a projection 52 outstanding from the mouth of bearing housing 16, by merely positioning the flange 51 over portion of the bearing housing 16 and rotating it. A radially inner abutment portion 53 of the retainer ring 50 bears against the annular rubber ring 49 to inhibit release.

FIGS. 4D and 4C are similarly part end elevations and sections respectively in first angle projection, of a bearing housing 16, both bearing housings 16 being of identical shape. A latching ramp 55 faces the retainer ring 50 and upon rotation of the retainer ring, a web portion 56 rides up over the ramp 55 and inhibits release of the retainer ring 50.

A consideration of FIG. 2 will show that the right hand bearing 30 is positively restrained against axial movement by the latch arms 39, and spacers 60 inhibit any movement of the bearing 30 in an outward direction. Axial dislodgement of the left hand bearing 30 is inhibited by the interconnection of the bearing housing 16 through the fan scroll. The retainer ring 50 at the left hand end has a closure cap 61 to inhibit ingress of moisture into the bearing.

A consideration of the above embodiment will reveal that assembly is very fast and involves only a small amount of labour. The bearings are assembled to the adaptors by merely pushing them onto the adaptors, the resilient rings are assembled to the bearings by merely pushing them over the outside of the bearings, the pulley is assembled to the adjacent adaptor again by a simple pushing movement until there is engagement of the leg barbs with the spokes of the pulley, and the pulley is assembled to the shaft by the plastic nail. At the other end of the impeller shaft, similarly the assembly takes place by a simple pushing movement. Final retention of the bearings is achieved by a part rotary movement respectively of the bayonet ring and the bayonet cap. After assembly has been achieved, a combination of the resilient adaptors and resilient mounting rings provide a good isolation of vibration from the impeller to the frame of the air cooler.

We claim:

1. A shaft and pulley assembly for a blower having a scroll housing containing an impeller,
    a square section shaft, a pulley, and means retaining the pulley on the shaft, said impeller having a hub with inner surfaces lying in face-to-face contiguity with surfaces of the shaft,
    a pair of adaptors carried on the shaft near respective ends thereof, each adaptor having four bearing lands of resilient plastics material, inner surfaces of the bearing lands lying in face-to-face contiguity with surfaces of the shaft, each bearing land having a curved external surface,
    a pair of bearings carried on respective said adaptors supported by said curved external surfaces thereof, and latches on at least one of said adaptors retaining its said bearing against relative displacement in an axial direction, and
    a pair of bearing housings each fixed with respect to said scroll housing, and each carrying a respective said bearing.

2. A shaft and pulley assembly according to claim 1 wherein said means retaining the pulley on the shaft comprises a pin in the shaft located near one end of the pulley hub.

3. A shaft and pulley assembly according to claim 2 comprising a pair of further pins in the shaft located one at each end of the impeller hub retaining the impeller hub on the shaft.

4. A shaft and pulley assembly according to claim 1 wherein at least one of the bearing lands comprises a resilient outstanding latch which retains a respective said bearing against axial dislodgement when that said land is inhibited from radially inward deflection by engagement against a said shaft surface.

5. A shaft and pulley assembly according to claim 4 wherein one of said adaptors comprises at least one latch arm which releasably engages said pulley.

6. A shaft and pulley assembly according to claim 4 wherein one of said adaptors comprises a resilient finger with a spigot near one end thereof, and said shaft contains an aperture releasably engageable by said spigot.

7. A shaft and pulley assembly according to claim 1 wherein each said bearing housing comprises a plurality of projections, and a bayonet-type retaining ring having a plurality of inturned flanges engageable over said housing projections, said retaining ring releasably retaining a said bearing in its housing.

8. A shaft and pulley assembly according to claim 7 further comprising a pair of elastomeric annular spacer rings between their bearings and their respective said housings, each said retaining ring abutting a respective said spacer ring.

9. A shaft and pulley assembly according to claim 1 wherein said impeller comprises a central wheel interconnecting the impeller blower blades to the impeller hub, said central wheel comprising a plurality of webs which slope in elevation, interconnected by a plurality of axially extending ribs.

* * * * *